Feb. 10, 1970 A. V. KISOVEC 3,494,707

CONVERTIPLANE

Filed Dec. 29, 1967 8 Sheets-Sheet 1

INVENTOR
ADRIAN V. KISOVEC

BY Matthew P. Lynch

ATTORNEY

INVENTOR
ADRIAN V. KISOVEC

BY Matthew P. Lynch

ATTORNEY

Feb. 10, 1970 A. V. KISOVEC 3,494,707

CONVERTIPLANE

Filed Dec. 29, 1967 8 Sheets-Sheet 3

INVENTOR
ADRIAN V. KISOVEC

BY Matthew P. Lynch

ATTORNEY

Feb. 10, 1970 A. V. KISOVEC 3,494,707

CONVERTIPLANE

Filed Dec. 29, 1967 8 Sheets-Sheet 4

INVENTOR
ADRIAN V. KISOVEC

BY Matthew P. Lynch

ATTORNEY

Feb. 10, 1970 A. V. KISOVEC 3,494,707

CONVERTIPLANE

Filed Dec. 29, 1967 8 Sheets-Sheet 5

INVENTOR

ADRIAN V. KISOVEC

BY Matthew P. Lynch

ATTORNEY

Feb. 10, 1970

A. V. KISOVEC 3,494,707

CONVERTIPLANE

Filed Dec. 29, 1967

8 Sheets-Sheet 6

INVENTOR

ADRIAN V. KISOVEC

BY Matthew P. Lynch

ATTORNEY

INVENTOR
ADRIAN V. KISOVEC

BY Matthew P. Lynch
ATTORNEY

INVENTOR
ADRIAN V. KISOVEC
BY Matthew P. Lynch
ATTORNEY

United States Patent Office 3,494,707

Patented Feb. 10, 1970

3,494,707

CONVERTIPLANE

Adrian V. Kisovec, Morton, Pa., assignor to The Boeing Company, Seattle, Wash., a corporation of Delaware Filed Dec. 29, 1967, Ser. No. 694,496

Int. Cl. B64c 27/24, 27/30

U.S. Cl. 416—130 6 Claims

ABSTRACT OF THE DISCLOSURE

Two-bladed variant "Rotafix" aircraft providing for fairing of inboard blades featuring blade folding and pitch control mechanism embodied in teetering rotor system wherein folding axis is concentric with roto shaft.

Background of the invention

The basic "Rotafix" concept utilizes a single blade, as is described, for example, in U.S. Patent 3,207,457. Modification of the original single-bladed rotor construction into a two-bladed design is accomplished by the present invention. Although significant weight savings and performance improvements can be obtained by replacing the counterweight of the single-bladed "Rotafix" with a second blade, the problem remains of how to dispose of the second (inboard) blade. In general, the two-bladed variant provides a higher figure of merit and lower weight in addition to the possibility of increasing solidity and hence disc loading which results in a smaller and lighter rotor, smaller and lighter wing, and better fixed-wing performance (lower fuel consumption).

However, such advantages can only be achieved at the expense of additional mechanical complexity required for blade folding, in addition to the requirement of higher lift co-efficients for the center wing during conversion.

Summary of the invention

Operating efficiency, above that available in the "Rotafix" single-bladed concept, is obtained by replacing the conventional counterweight with a second (inboard) blade while permitting fairing of the inboard blade to reduce aerodynamic drag during fixed-wing flight. The resulting two-bladed variant permits the vehicle to have a higher payload and lower gross weight than the single-bladed variant and is, therefore, more competitive with other VTOL systems. The better match in disc and wing loading obtained provides an ideal combination of economical hover mode and high subsonic speed flight, while providing a good power match. As compared with other composite craft having stopped rotors, the present two-bladed variant provides simplicity in blade folding and stowing.

Description of the preferred embodiment

Figure 1:
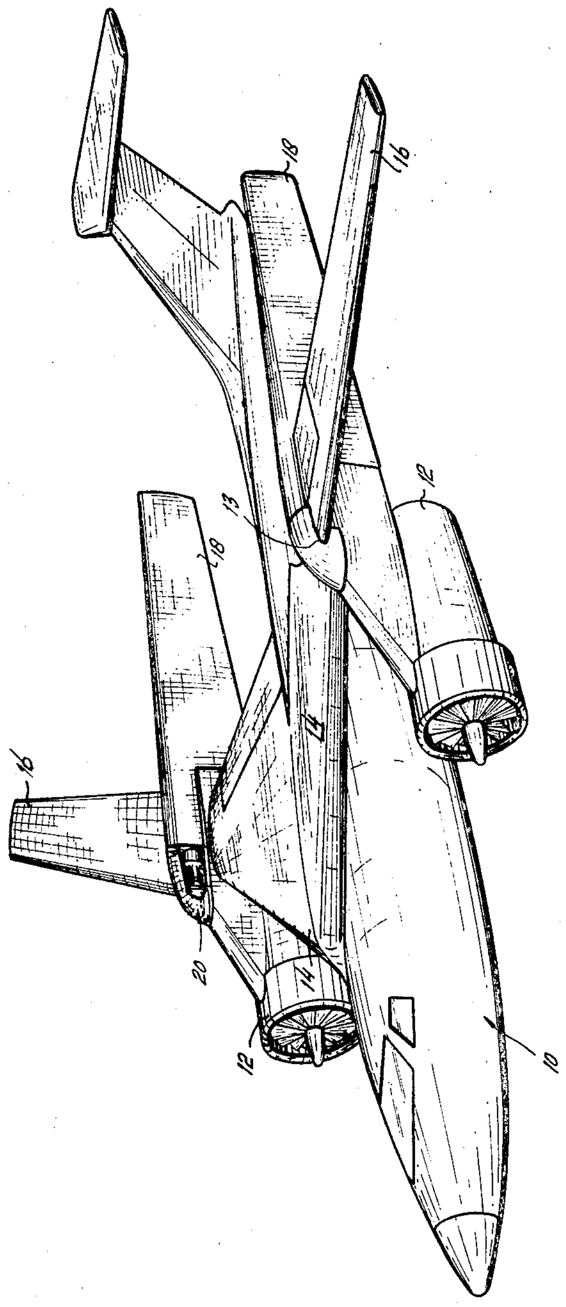
FIGURE 1 is a perspective view illustrating the two-bladed variant "Rotafix" concept with the outboard blades in fixed-wing-flight position and the inboard blades folded to trailing position forming extensions of the engine pylons.

FIGURES 1–4 illustrate generally the subject two-bladed "Rotafix" concept in which the inboard blade continues to rotate about the fold axis to a trailing position when the outboard blade is stopped in a substantially lateral fixed-flight position. After the inboard blade achieves a trailing position, it is feathered or rotated about its pitch axis in such a manner as to form a continuation or extension of the engine pylon. Thus, the drag of the folded blade is mainly frictional and does not affect performance significantly.

The reference numeral 10 designates generally the "Rotafix" aircraft which is provided with power plants 12 mounted at the ends of fixed center wing 14.

Figures 2, 3:
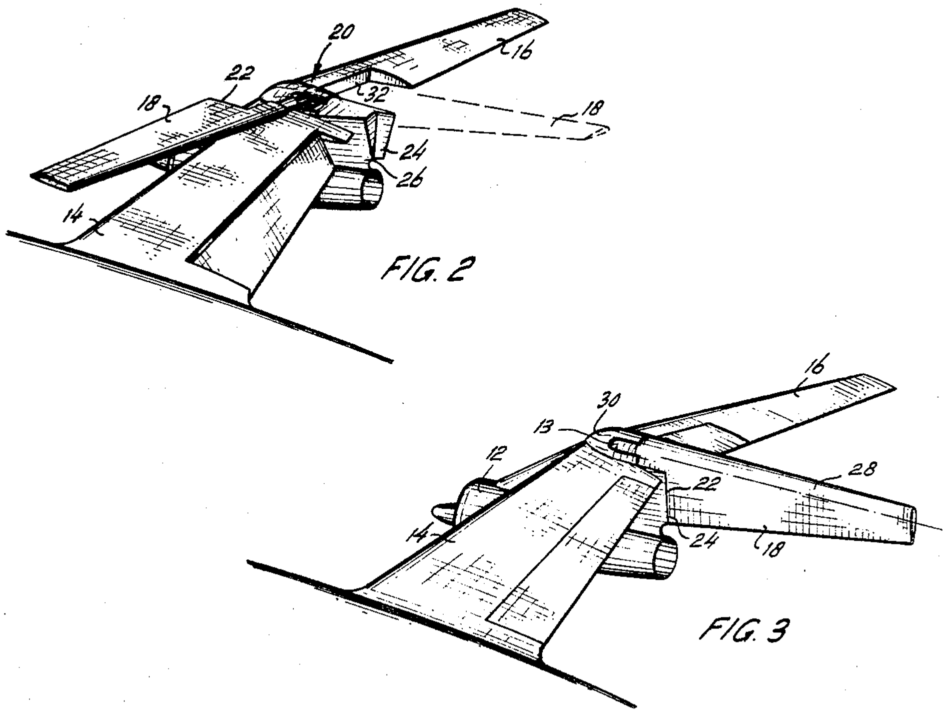
FIGURE 2 is a perspective view illustrating the rotary wing mode of operation.
FIGURE 3 is a perspective view illustrating the rotor stopped wherein the outboard blade is infixed position, while the inboard blade has been folded and feathered to assume its trailing position as an extension of the engine pylon.

The rotary-wing mode of operation is illustrated in FIGURE 2, in which reference numerals 16 and 18 designate the outboard and inboard blades, respectively, of the rotor assembly which is designated generally by the reference numeral 20. When the rotor is being stopped and while outboard blades 16 are advancing to attain their fixed position, the retreating inboard blades 18 continue to move (fold) until they come into the trailing position, illustrated by dotted lines in FIGURE 2, in which they are stopped. At approximately the same time the rotor assembly 20 is locked against flapping. The folding of the inboard blades 18 is enhanced by aerodynamic and inertia forces and, therefore, the folding mechanism functions mainly to accurately position the blades in the correct trailing orientation.

More specifically, while the rotor assembly 20 is being stopped, each outboard blade 16 is locked into the position illustrated in FIGURE 2 while each inboard blade 18 continues to move and eventually is folded into its trailing position illustrated in FIGURE 3. The faired trailing position of each inboard blade 18 is achieved by feathering blade 18 until portion 22, located behind the spar, fits within recess 24 of pylon 26. In this manner, inboard or trailing blade 18 forms an extension of pylon 26 while leading edge portion 28 forms a continuation of hub fairing 30. The hub fairing 30 is secured to a hub 58 and rotates therewith. The fairing 30 is provided with a cut-out 13 through which the spar of blade 18 can pass for purposes of folding.

Figure 4:
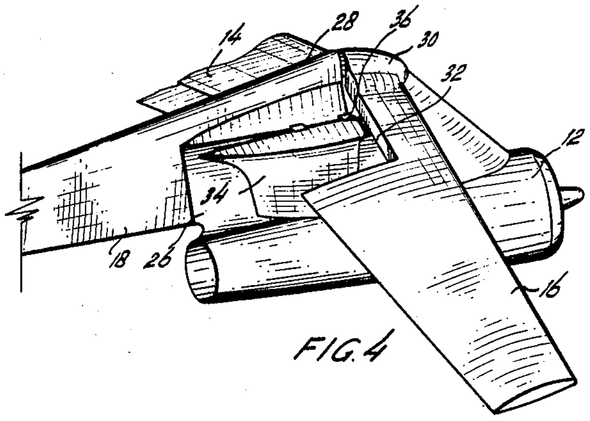
FIGURE 4 is a perspective view illustrating fairing of the fixed outboard blade by a member hinged to the outboard blade by a member hinged to the outboard side of the engine pylon.

To complete the operation, cut-out 32 of each outboard blade 16 is faired, as seen in FIGURE 4, by a fairing member 34 which is attached to the outboard side of each pylon 26 with hinge assembly 36.

Unfolding is accomplished by unfeathering each inboard or trailing blade 18 and unlocking each outboard blade 16, after which outboard blade 16 begins to advance or rotate forward until both blades are aligned (FIGURE 2). Only then does inboard or trailing blade 18 begin to move in unison with outboard or fixed blade 16. This unfolding operation does not require a powerful folding actuator since no impeding forces act on the inboard or trailing blade 18 and the aerodynamic lift provides a component directed forward which tends to rotate the outboard blade in the proper direction.

Figures 5, 6:
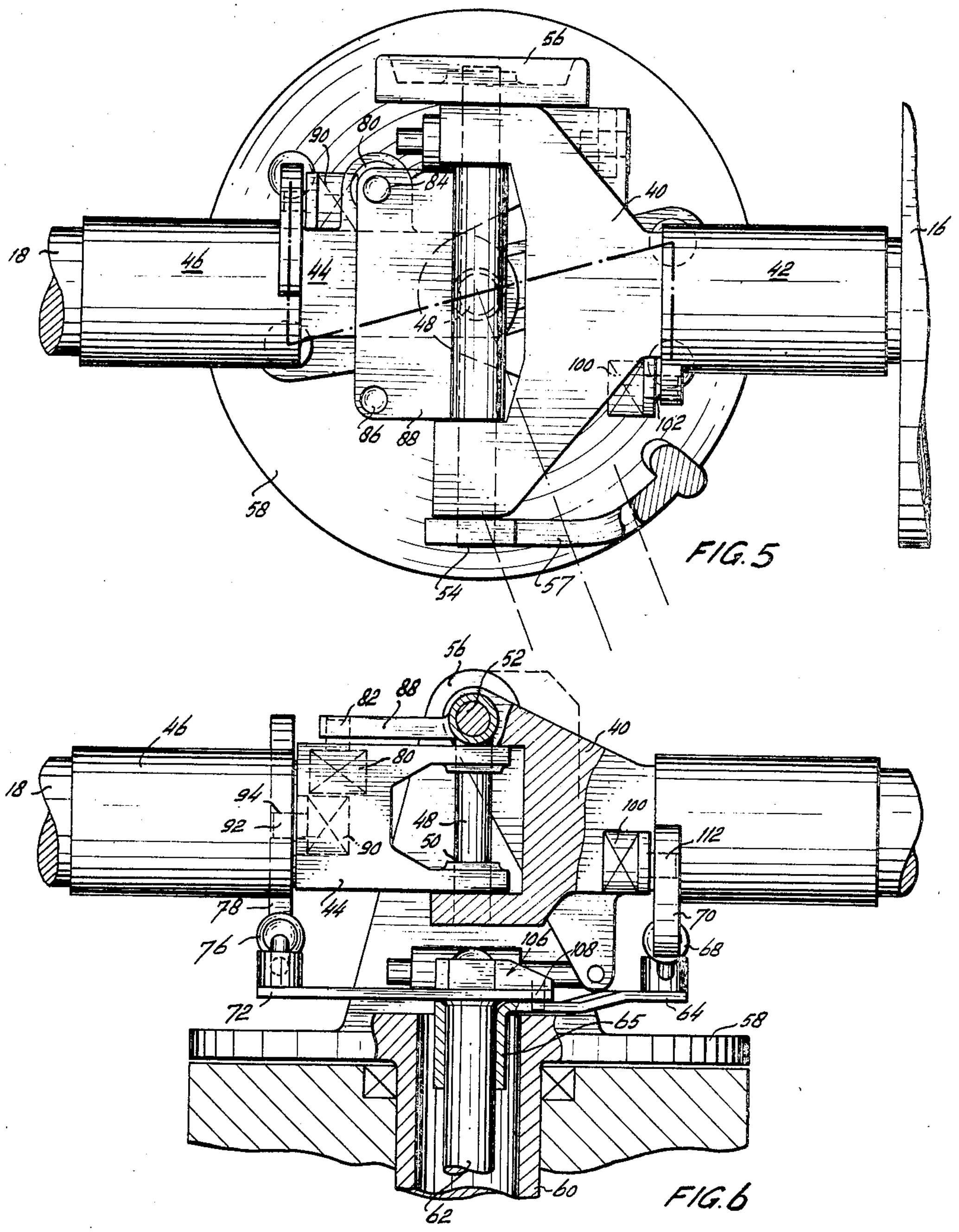
FIGURE 5 is a top view of the blade folding and pitch control mechanism.
FIGURE 6 is a side view partly in section of the blade folding and pitch control mechanism.
Figure 7:
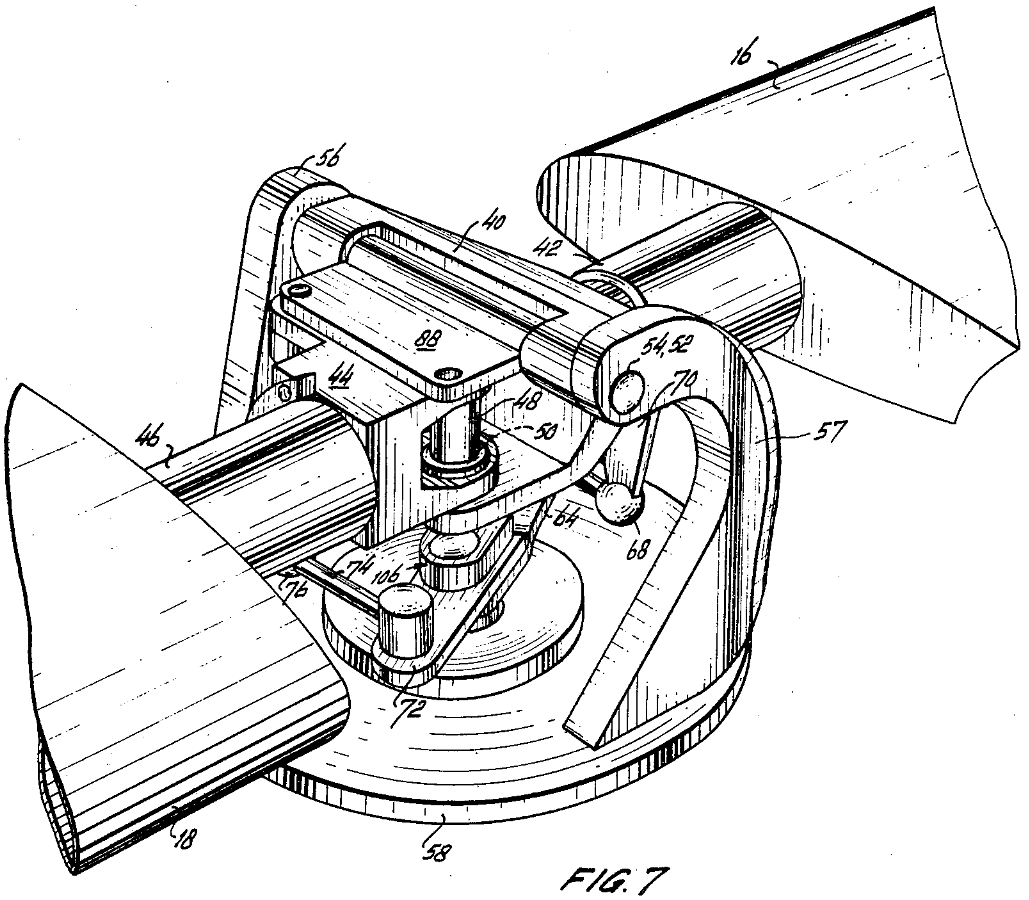
FIGURE 7 is a perspective view of the blade folding and pitch control mechanism.

The construction of the blade folding and pitch control mechanism is illustrated in FIGURES 5–7. Outboard blade 16 is secured to trifurcated rocker arm 40 through pitch housing 42, while inboard blade 18 is secured to bifurcated arm 44 through pitch housing 46. Inboard blade 18, together with pitch housing 46 and bifurcated arm 44, rotates to permit blade folding about pin 48 which extends through openings 50 in arm 44.

Pin 48 is secured at its upper end to rod 52 which, in turn, is mounted within openings 54 of centric hub lug 56 and excentric hub lug 57 which are mounted on hub 58. The lower end of pin 48 is retained by the lower tang of the trifurcated rocker arm 40. The upper tangs of trifurcated rocker arm 40 are rotatably disposed about rod 52 in spaced relationship about a fixed flange 88 which is secured to the rod 52 between the tangs of arm 40. By attaching trifurcated arm 40 about rod 52, attaching bifurcated arm 44 about pin 48 and securing pin 48 to rod 52 and trifurcated arm 40, both blades 16 and 18 can teeter together about the rod 52 which is rigidly secured between hub mounted lugs 56 and 57.

The rotor shaft is designated generally by reference numeral 60 while the pitch control rod is designated by reference numeral 62.

Pitch arm 64 is located below rocker arm 40 and terminates in cylindrical base 65 surrounding pitch control rod 62 while being secured at the other end to pitch link 66 which, in turn, terminates in spherical joint 68 which is attached to the bottom portion or horn 70 of pitch housing 42.

Pivotable pitch arm 72 is secured at one end to pitch control rod 62 while being secured at the other end to pitch link 74 which, in turn, terminates in spherical joint 76 which is attached to the bottom portion 78 or horn of pitch housing 46.

A first actuator 80 is mounted on rotatable bifurcated rocker arm 44 for unlocking and locking the foldable blade 18 by regulating the position of folding pin 82 with respect to openings 84 or 86 located within flange 88. When pin 82 passes through opening 84, inboard blade 18 is retained in its unfolded position as shown in FIGURE 2, while blade 18 is retained in its folded position as shown in FIGURE 3 when pin 82 passes through opening 86.

Figures 8, 9, 10:
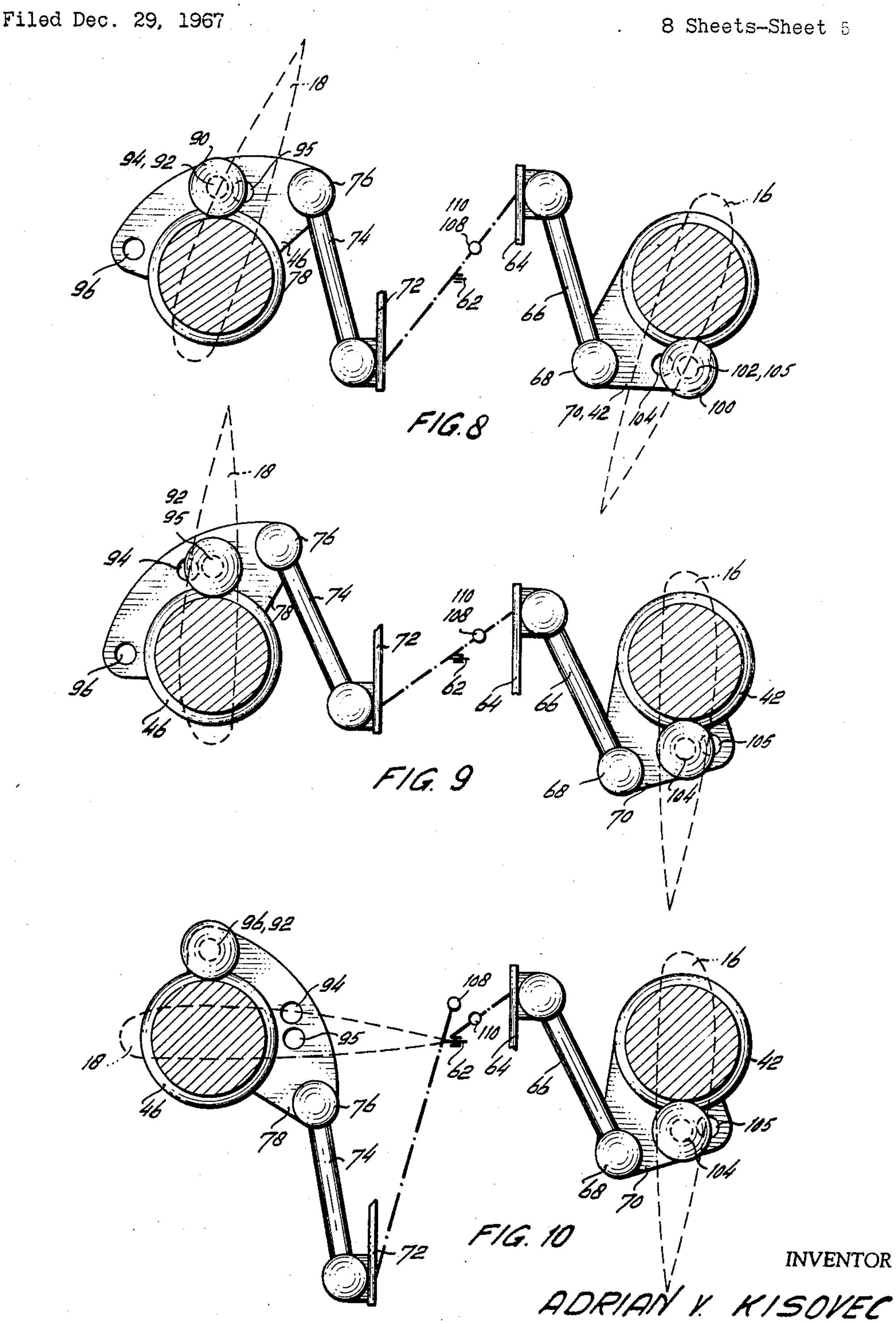
FIGURE 8 is a sectional view illustrating the position of pitch housing and linkage mechanism during the rotary-wing mode of operation.
FIGURE 9 is a sectional view illustrating the position of pitch housing and linkage with inboard and outboard blades locked in pitch and inboard blade beginning to fold.
FIGURE 10 is a sectional view illustrating the position of pitch housing and linkage mechanism during feathering of the inboard blade when the outboard blade is fixed in pitch.

A second actuator 90, also mounted on rocker arm 44, is used to lock blade 18 in pitch. Specifically, pitch pin 92 is designed to pass through openings 94, 95, and 96 within pitch housing 46, as illustrated in FIGURES 8–10.

Similarly, a third actuator 100 with pin 102 is mounted on rocker arm 40 to lock blade 16 in pitch. Pin 102 is designed to pass through openings 104 and 105 within housing 42, as seen in FIGURES 8–9.

Although actuators 80 and 90 have been schematically illustrated separately, it will be apparent that a single actuator can be used to perform the functions of actuators 80 and 90.

Figure 11:
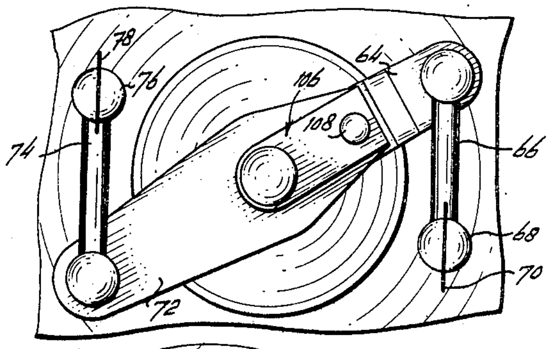
FIGURE 11 is a top view illustrating the relative position of the pitch control arms during the rotary-wing mode of operation.
Figure 12:
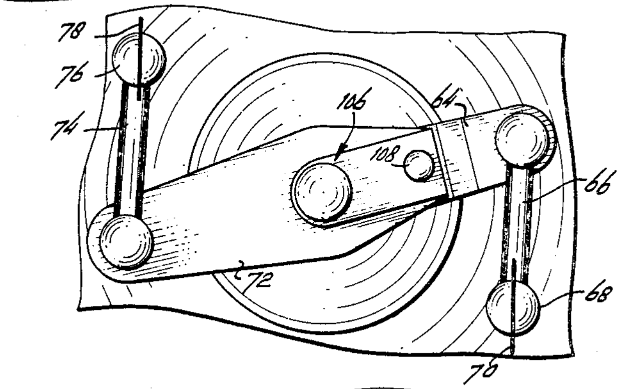
FIGURE 12 is a top view illustrating the relative position of the pitch control arms with inboard and outboard blades fixed in position.
Figure 13:
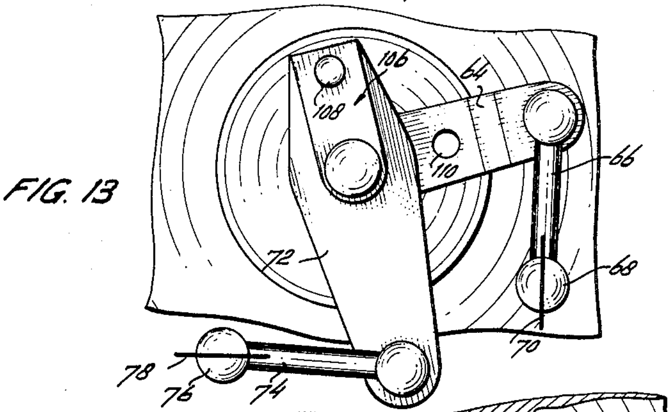
FIGURE 13 is a top view illustrating the relative position of pitch control arms during folding of inboard blade.

A rotary actuator assembly 106, including pin 108, rotates inboard blade 18 into trailing position through the pitch control linkage. Note that pitch arm 64 is provided with an opening 110 (FIGURE 8) through which pin 108 is inserted to permit pitch arm 64 and 72 to move as a single unit when the convertiplane is operating in its rotary-wing mode, as illustrated in FIGURE 11. A mechanism consisting of an actuator (not shown) is utilized to remove the pin 108 from the opening 110 in the pitch arm 64 before the inboard blade 18 is folded to its trailing position. Since pitch housing 46 rotates with the folding inboard blade 18, the entire pitch control mechanism, including pitch arm 72 and pitch link 74, follows the folding action, as shown in FIGURE 13, thus eliminating the need to dephase the pitch linkage, providing the pin 108 is removed from opening 110. Thus, it is apparent that the pitch control mechanism not only performs its usual function of adjusting the pitch of the blades during operation, but in addition phases and folds the blades when they are stopped.

Figure 14:
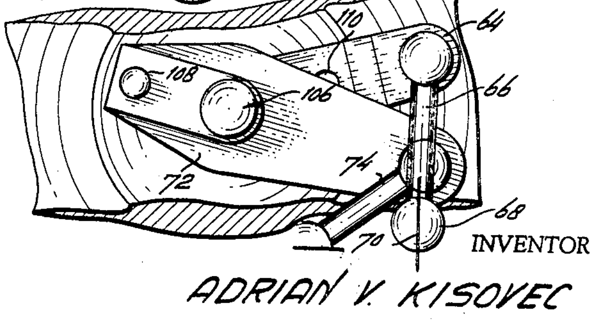
FIGURE 14 is a top view illustrating the relative position of pitch control arms during feathering of inboard blade.
Figures 15, 16, 17:
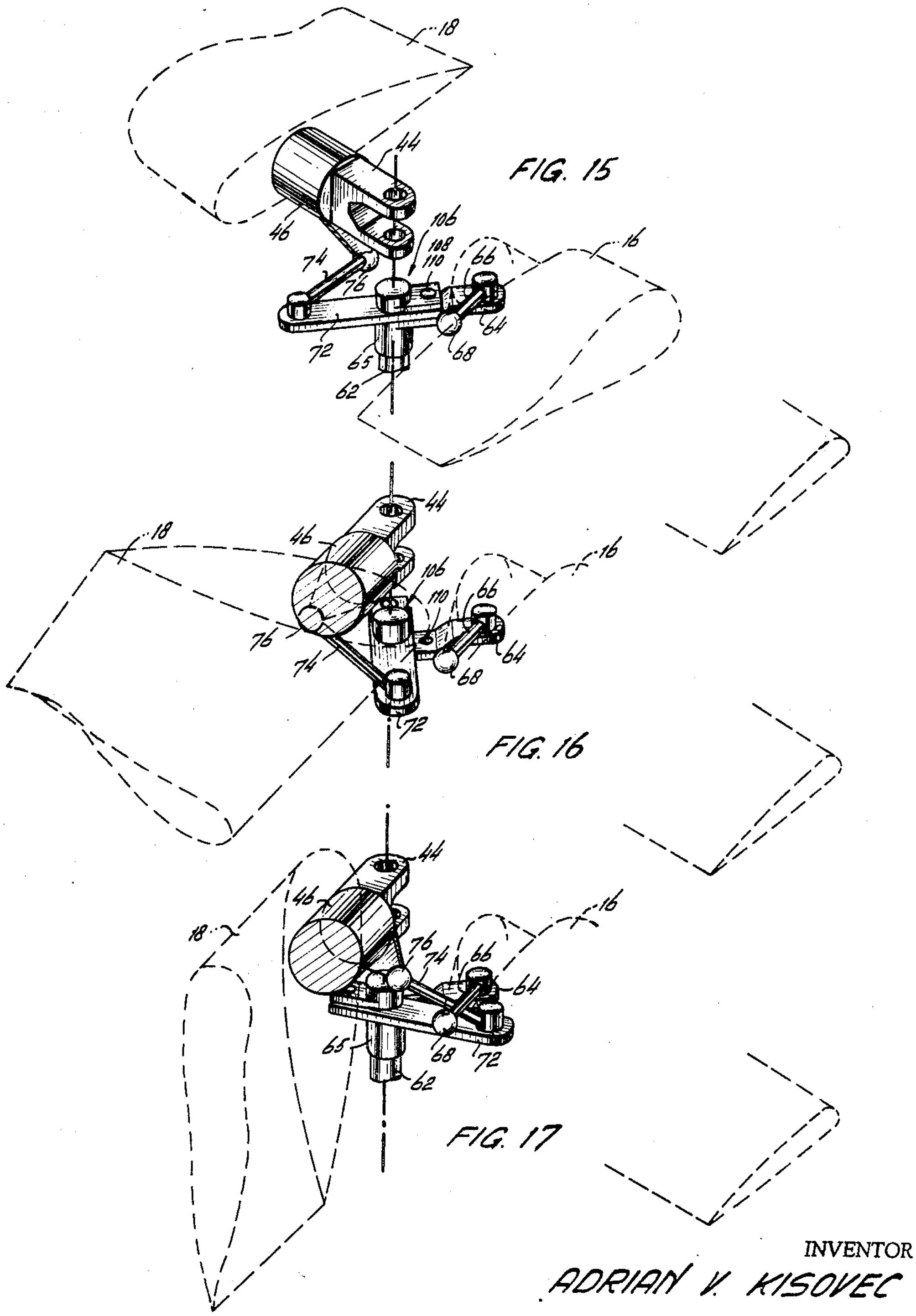
FIGURE 15 is a perspective view illustrating the blade folding and pitch control mechanism during the rotary-wing mode of operation.
FIGURE 16 is a perspective view illustrating the blade folding and pitch control mechanism during the inboard blade folding operation.
FIGURE 17 is a perspective view illustrating the blade folding and pitch control mechanism during the inboard blade feathering operation.

The rotary mode of operation is illustrated in FIGURES 8, 11 and 15 wherein the position and relationship of the previously described blade folding and pitch control mechanisms are readily apparent. In like manner, the position and relationship of the blade folding and pitch control mechanisms when the outboard blade 16 is locked in pitch and the inboard blade 18 is beginning to fold while also locked in pitch is shown in FIGURES 9, 13, and 16. Finally, the position and relationship of the blade folding and pitch control mechanisms during feathering of inboard blade 18 is illustrated in FIGURES 10, 14, and 17.

Figure 18:
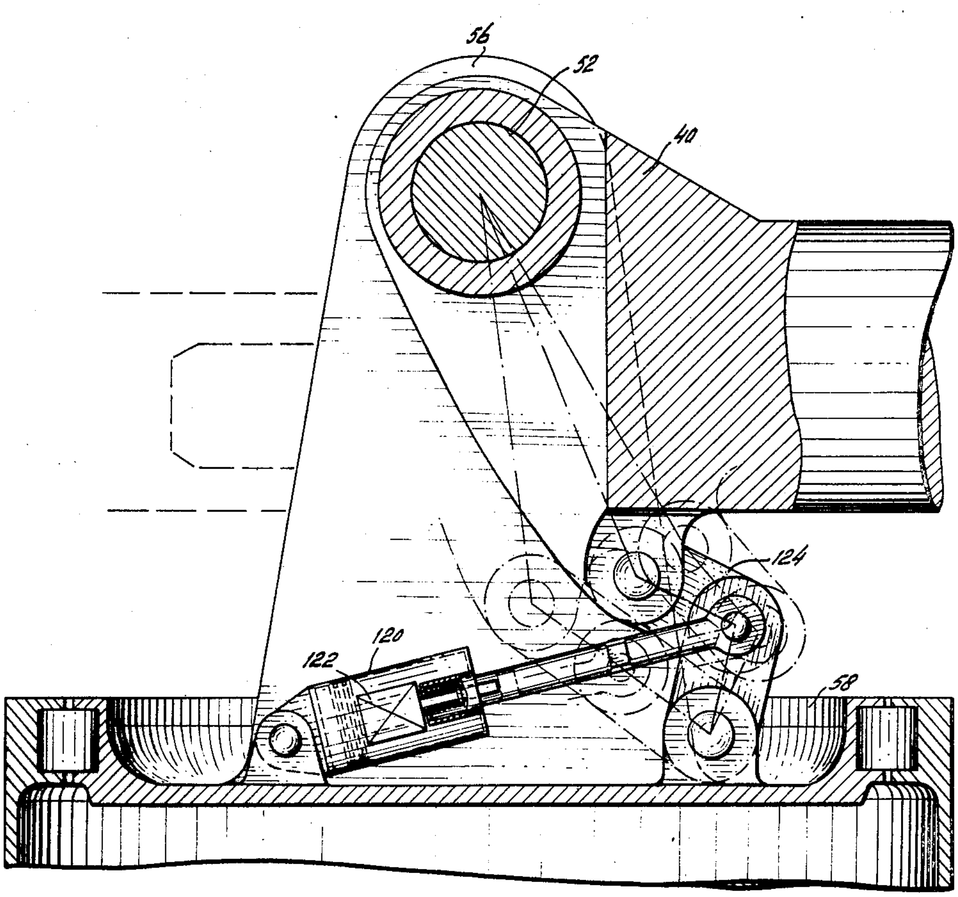
FIGURE 18 is a side view partly in section illustrating the teetering mechanism for the outboard blade.

The teetering mechanism is disclosed in FIGURE 18 wherein the reference numeral 120 designates an actuator within which a centrifugal valve 122 is mounted, the various positions of linkage 124 being illustrated.

During rotary-wing mode, linkage 124 and actuator 120 permit free teetering of the rotor. When the rotor is stopped or nearly stopped, centrifugal valve 122 opens and energizes the actuator 120 causing the linkage 124 to travel over-center and thereby lock the blade 16 against further teetering or flapping in its fixed-wing flight mode.

An advantage of this invention is that a single pitch control means can be utilized to both control the pitch of a first and second blade and also fold one of the blades about its mounting axis. Another advantage is to provide a simple, compact, efficient apparatus for changing the pitch of and folding a second blade on the "Rotafix" variant. A further advantage is to provide a mounting arrangement about which both an inboard and outboard blade can teeter and about which the inboard blade can be folded to a folded position.

For purposes of exemplification, particular embodiments of the invention have been shown and described according to the best understanding thereof. However, it will be apparent that changes and modifications in the arrangement and construction of the parts thereof may be resorted to without departing from the spirit and scope of the invention.

What is claimed is:

1. A rotor system comprising:

a rotatable drive shaft;

a rotor hub assembly mounted on said drive shaft for rotation therewith;

a first non-folding rotor blade having a pitch axis and mounted on said hub assembly for rotation about said pitch axis; and a second blade having a pitch axis and a fold axis transverse to said pitch axis and mounted on said rotor hub assembly for selective rotation about either said pitch axis or about said fold axis, said rotor hub assembly including means for controlling rotation of both said first and second blades about their associted pitch axes and rotating said blade only about its fold axis.

2. A rotor system in accordance with claim 1 wherein said second blade is movable about said fold axis between an extended position and a folded position and wherein said rotor hub assembly includes means for locking said first and second blades against rotation about said pitch axes when said second blade is in said folded position.

3. A rotor system in accordance with claim 1 wherein said rotor hub assembly includes:

first and second pitch housings operatively associated with said first and second blades;

a pitch control rod;

coupling means operable for releasably locking said pitch housing of said first blade and said pitch housing of said second blade together; and actuation means for rotating said second blade about said fold axis when said coupling means is operated to release said pitch housings from locked relationship.

4. A rotor system in accordance with claim 3 wherein said second blade is movable about said fold axis independently of said first blade between an extended position and a folded position and wherein said rotor hub assembly includes means for locking said first and second blades against rotation about said pitch axes when said second blade is in said folded position.

5. A rotor system in accordance with claim 3 wherein said means connecting said pitch housings of said first and second blades comprises:

a first pitch arm connected to said pitch control rod;

linkage connecting said first pitch arm to said pitch housing on said first blade;

a second pitch arm connected to said pitch control rod;

linkage connecting said second pitch arm to said pitch housing on said second blade; and means for disconnecting said first pitch arm from said control rod, whereby said pitch control rod can be rotated without causing said first blade and its pitch housing to rotate therewith.

6. A rotor system in accordance with claim 1 wherein said rotor hub assembly includes:

a rod pivotally secured to said hub;

a pin secured to said rod and substantially transverse thereto;

a rocker arm rotatably securing said second blade to said pin; and a rocker arm pivotally securing said first blade to said rod and said pin in surrounding relationship to said second blade securing rocker arm, whereby said first and second blades can pivot about said rod in unison and said second blade can rotate about said pin independently of said first blade.

References Cited

UNITED STATES PATENTS

| | | | |
|---|---|---|---|
| 2,715,506 | 8/1955 | Peterson ------ | 170—160.12 X |
| 3,207,457 | 9/1965 | Kisovec. | |
| 3,248,073 | 4/1966 | Blythe ------------ | 244—6 X |
| 3,404,852 | 10/1968 | Sambell et al. -- | 170—160.12 X |

EVERETTE A. POWELL, Jr., Primary Examiner

U.S. Cl. X.R.

244—7; 416—143